(No Model.)  6 Sheets—Sheet 1.

F. H. RICHARDS.
WEIGHING MACHINE.

No. 600,034.  Patented Mar. 1, 1898.

Witnesses:
J. L. Edwards Jr.
Fred J. Dole.

Inventor:
F. H. Richards (No Model.) F. H. RICHARDS.
WEIGHING MACHINE.

No. 600,034. Patented Mar. 1, 1898.

6 Sheets—Sheet 2.

Witnesses:
J. L. Edwards Jr.
Fred. J. Dole.

Inventor:
F. H. Richards

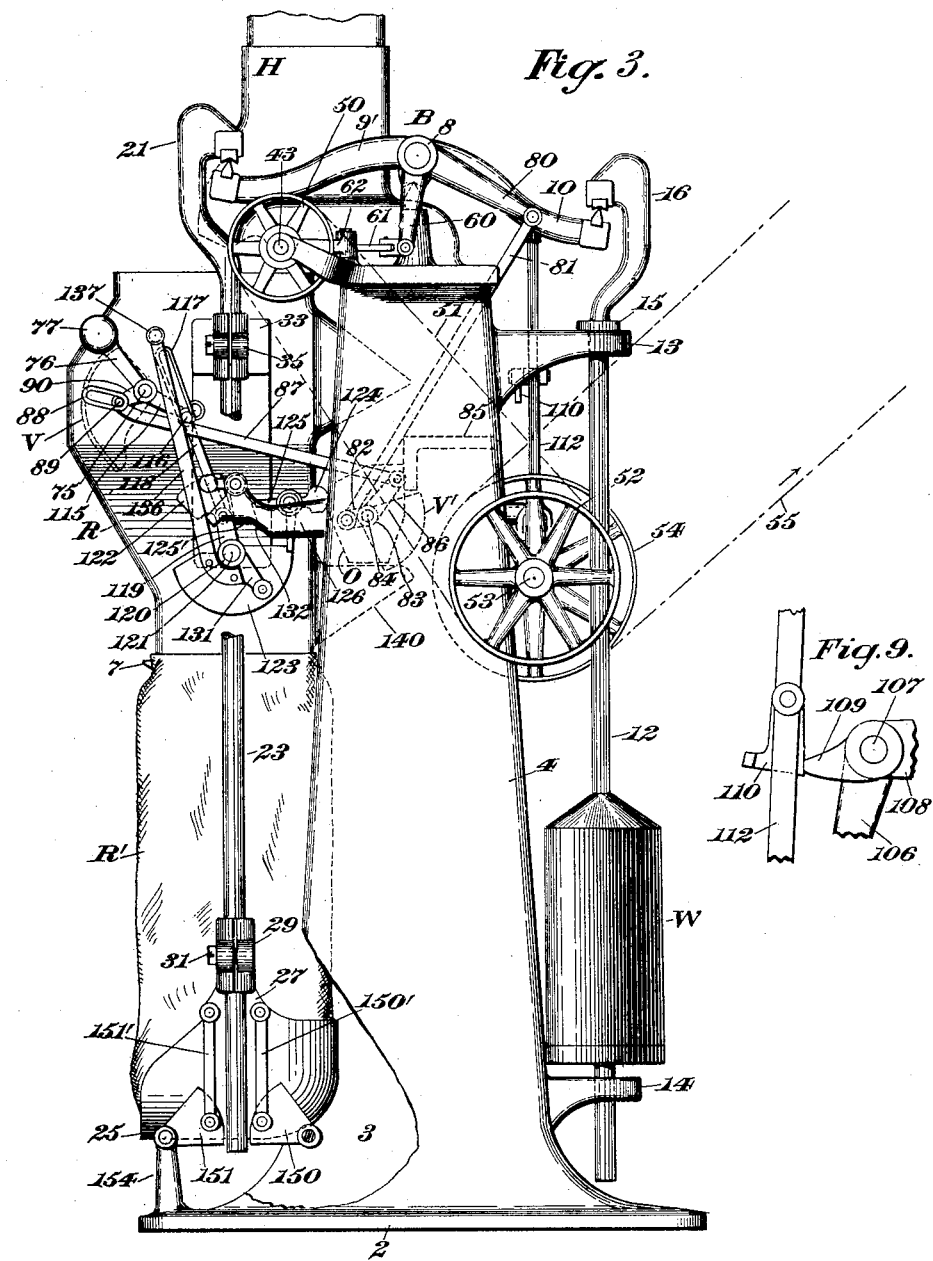

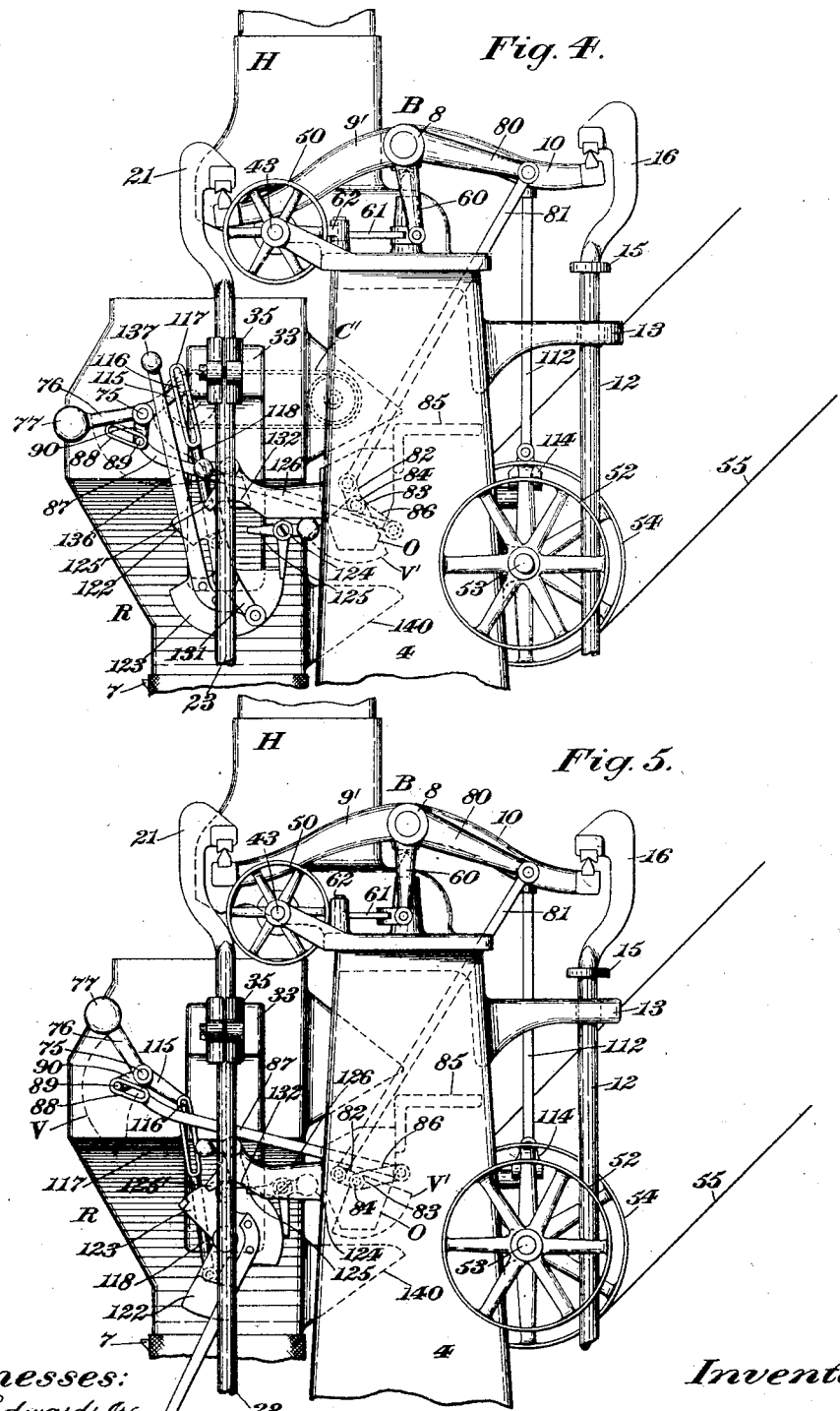

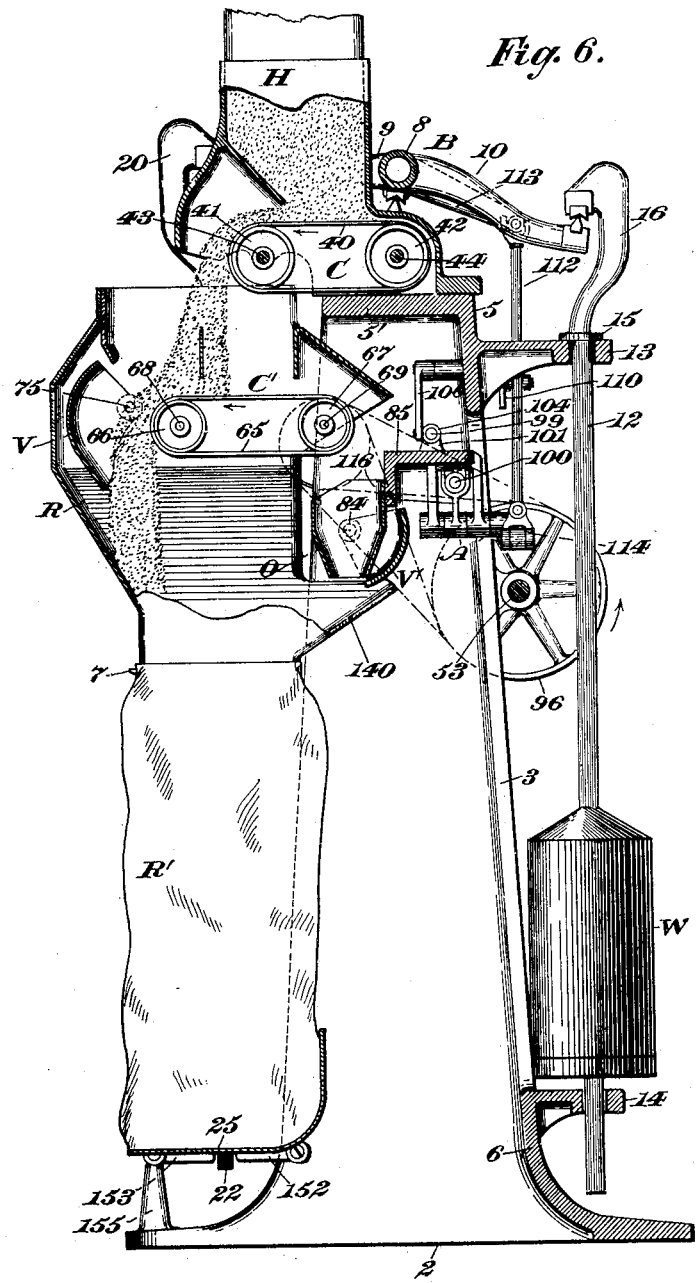

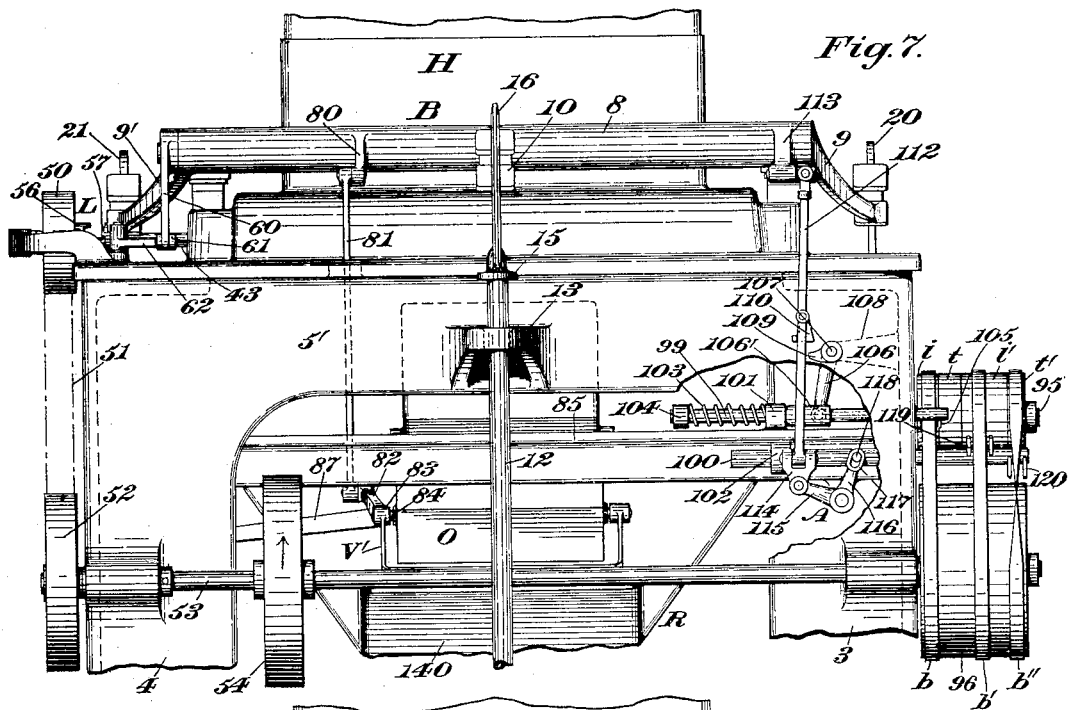

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,034, dated March 1, 1898.

Application filed May 8, 1897. Serial No. 635,718. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to machines for weighing granular and other substances, the object being to provide an improved machine of the kind disclosed by my concurrently-pending application, Serial No. 632,917, filed April 20, 1897, the load-carrying means of the weighing mechanism in the present case comprehending a plurality of receivers, one of which is preferably removable and consists of a bag or similar device, said receivers being supplied with an overload or quantity of material in excess of the predetermined load, part of the mass being delivered to one of said receivers and the remainder to the other receiver, a conveyer mounted for movement with or on the load-carrying means being preferably provided to force or remove the surplus or overcharge from the weighing mechanism, and in the present case the driving means for said conveyer is controlled by the weighing mechanism as it reciprocates during the weighing of a load.

Figure 1:
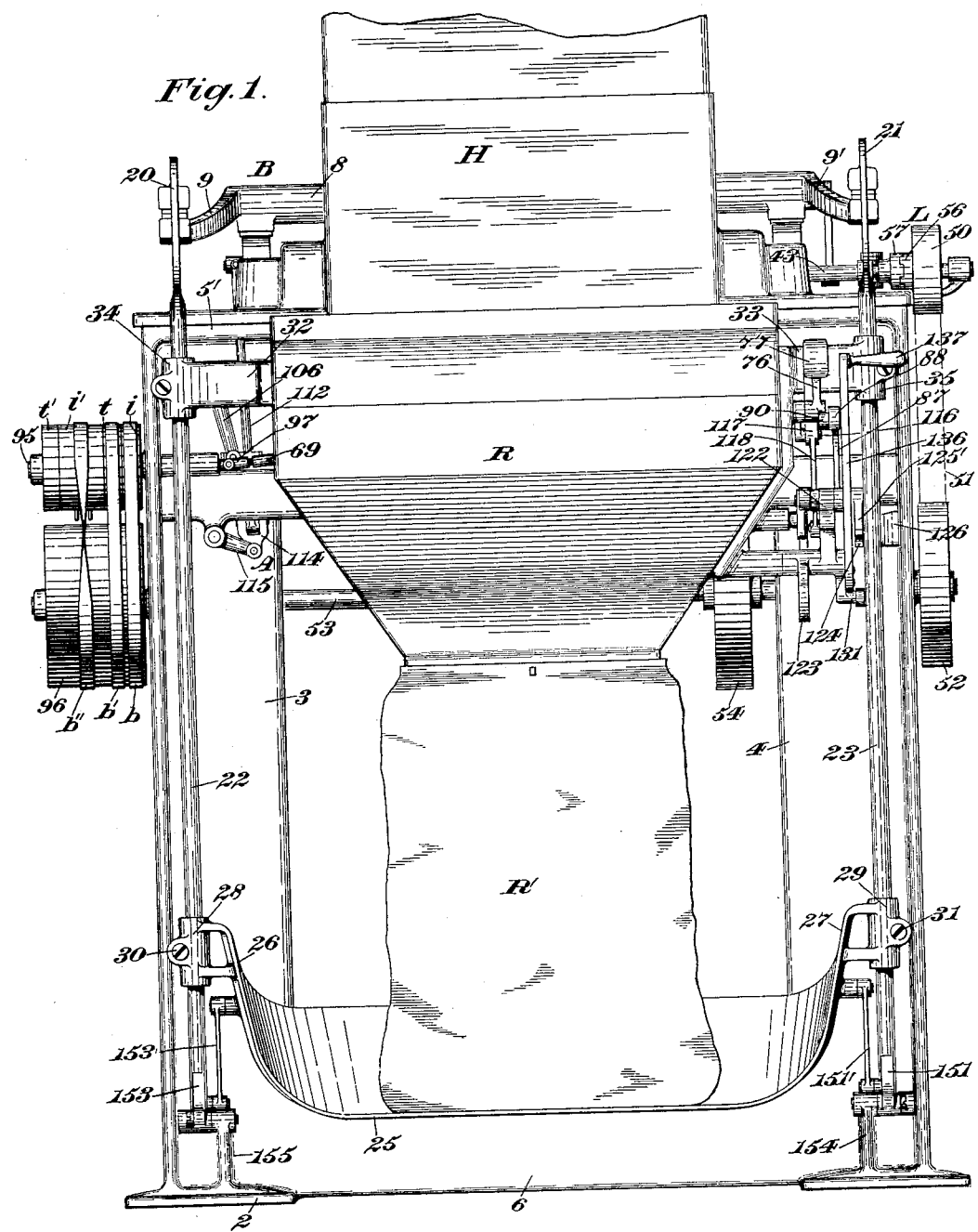
Figure 2:
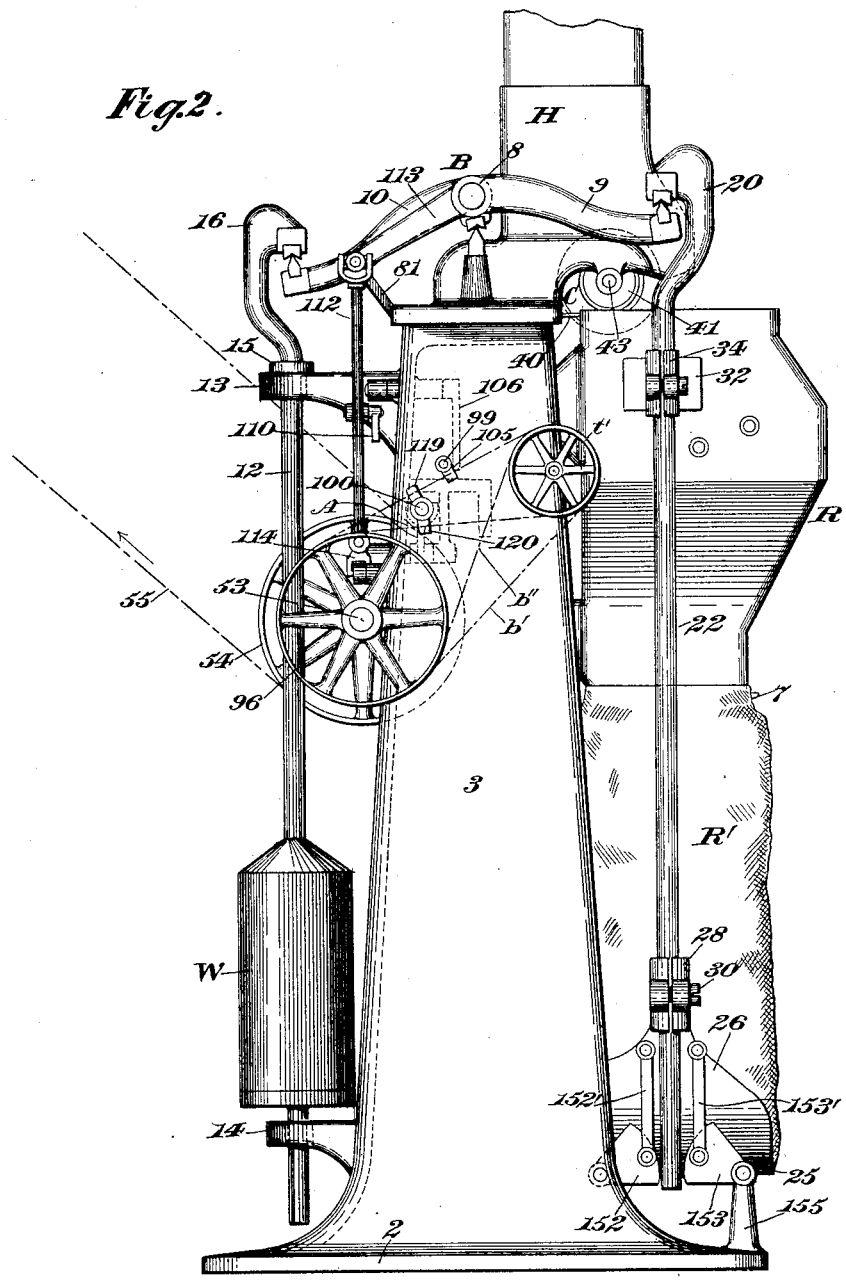

In the drawings accompanying and forming part of this specification, Figure 1 is a front elevation of my improved machine. Figs. 2 and 3 are end elevations of the same as seen from the left and right, respectively, in Fig. 1. Figs. 4 and 5 are end elevations of the upper part of the machine as seen from the right in Fig. 1, showing the positions occupied by the different parts at two stages in the operation. Fig. 6 is a longitudinal central section. Figs. 7 and 8 are rear elevations of the upper part of the machine, the parts being in the positions corresponding, respectively, with Figs. 4 and 5; and Fig. 9 is a detail view hereinafter more particularly described.

Similar characters designate like parts in all the figures of the drawings.

The framework for sustaining the various parts of the machine may be of any suitable character, it consisting of the base or bed 2, the side frames 3 and 4, and the top and bottom plates 5 and 6, respectively, the plate 5 being represented as angular in cross-section and the horizontal portion 5' thereof supporting the supply mechanism hereinafter more particularly described.

The weighing mechanism preferably embodies a scale-beam, as B, and load-carrying means suspended therefrom, the load-carrying means comprising in the present case the hopper-shaped receiver R, beneath the outlet of which the other receiver can be suitably supported, the last-mentioned receiver consisting in the present case of the bag R', which is hung from the spur or hook 7, situated near the lower or discharge end of the receiver R.

The scale-beam B consists in the present instance of a hollow shaft 8, the parallel arms 9 and 9', and the oppositely-disposed arm 10, the load-carrying means depending from the arms 9 and 9' and the arm 10 serving as a convenient means for supporting a counterweight, as W, which is of a mass equal to the load-carrying means and the predetermined charge.

The weight W is suitably secured to the longitudinal rod or bar 12, which passes through suitable guide-apertures formed in the brackets 13 and 14, respectively, on the framework, said rod having at its upper end the stop or shoulder 15 by which its action is limited. The rod 12 is equipped at its upper end with the hook 16, carrying the usual V-shaped bearing mounted on a knife-edge pivot on the rearwardly-extending arm 10 of the scale-beam.

The transverse rock-shaft 8 of the beam is furnished, preferably, with the ordinary V-shaped bearings resting on corresponding knife-edges on the top beam 5, the forwardly-extending arms 9 and 9' of said scale-beam being furnished with similar knife-edges, upon which rest coöperating V-shaped bearings suitably secured to the hooks 20 and 21 of the two hangers 22 and 23, respectively.

Means to be hereinafter described are provided for overloading the load-carrying means, the latter consisting of the receivers R and R', said receiver R' being removable and, as hereinbefore stated, being preferably suspended from the hook or spur 7 on the receiver R and resting upon the support 25. The bag-support 25 is in the form of a concaved shelf having lateral extensions 26 and 27, which terminate in clamps 28 and 29, embracing the hangers 22 and 23, respectively, said clamps, and consequently the bag-support 25, being held in an adjusted position by the usual set-screws 30 and 31.

The bag R' is in the nature of a main receiver, the bulk of the predetermined load being supplied thereto and the remainder to the auxiliary receiver or hopper R. The receiver R has on its opposite sides the projections 32 and 33, furnished at their outer ends with clamps 34 and 35, respectively, by which the hopper can be raised or lowered on its hangers, it being held in an adjusted position by the usual set-screws connected with the two clamps.

The instrumentalities for overloading the load-carrying means or the receivers R and R', respectively, may be of any suitable character, they consisting in the present case of the feed hopper or case H and the conveyer C, housed or disposed in said hopper, the feed-hopper being suitably secured to the horizontal flat portion 5' of the top plate.

The conveyer C is represented consisting of an endless belt 40, passed around the supporting-rolls 41 and 42, the shafts 43 and 44 of which are journaled in the end walls of the feed-hopper, suitable means preferably controlled by the weighing mechanism being provided to operate the conveyer and to throw it out of action when the load-carrying means is overcharged.
The shaft 43 of the conveyer C carries a suitable driver, such as the pulley 50, connected by a belt, as 51, to the pulley 52, which is suitably secured to the transverse power-shaft 53, carried by the framework, said power-shaft being furnished with a power-transmitter, as the pulley 54, connected by a belt 55 to a suitable motor. (Not shown.)

The driving mechanism for the conveyer C comprehends as a part thereof a clutch, as L. The clutch L consists of the usual two members 56 and 57, the member 56 being fixed to the continuously-rotative driver or pulley 50, while the clutch-section 57 is slidable on the shaft 43, whereby it can be coupled to and uncoupled from its companion to stop and start alternately the conveyer C.

The actuator for the clutch or the slidable member thereof consists of a rock-arm 60, depending from the shaft 8 of the scale-beam, said actuator or rock-arm being connected, preferably, by a universal joint to the arm 61 of the lever 62, pivoted to the upper portion of the plate 5, the arm 62 of the angle-lever being suitably connected with the clutch member 57, whereby at a predetermined point in the descent of the load-carrying beam-arms the two clutch members will be disengaged to uncouple the driver 50 from the conveyer C.
The load-reducing means in the present case consists of a conveyer, as C', which may be of any suitable character. Said conveyer C' is mounted in the receiver or hopper R in line with the falling stream from the conveyer C and consists of an endless belt 65, carried by the rolls 66 and 67, the shafts 68 and 69 of said rolls being journaled in the opposite end walls of the receptacle or hopper R.

The conveyer C' is preferably driven in reverse or opposite directions during the weighing of a load, and it has three periods of action. On its first movement it is adapted to deliver the proper quantity to the bag or main receiver R'; on the second, to force or remove the surplus from the load-carrying means on the weighing mechanism, and, on the third, to deliver the mass in the receiver or hopper R into the bag, it being understood that the material in the receiver R after the withdrawal of the surplus constitutes a part of the predetermined or true load.

In connection with the conveyer C', mounted on the weighing mechanism, I prefer to employ a valve, such as V, supported for action adjacent to the delivery end of said conveyer, said valve preferably being of "oscillatory" type and carried by a shaft 75, journaled in the ends of the hopper, one end of said shaft extending beyond the hopper and carrying an arm 76, which is furnished with a valve-actuator or weight 77.

At the commencement of operation the conveyer C' will be driven, by mechanism hereinafter described, in the direction of the arrow (see Fig. 6) to force or feed the supply-stream received from the conveyer C into the empty bag R', and when a certain amount of the material is received by said bag the poising side of the weighing mechanism will descend, and at a predetermined stage in this operation the valve V will be swung closed to permit the accumulation of material in the receiver R, which is retained by the valve V when in the position shown in Fig. 4 and by the conveyer C', the material continuing to bank up on the valve and the conveyer C' until the two receivers are overloaded.

The operation of the valve V is controlled by the weighing mechanism, it being preferably connected with the scale-beam for this purpose. The transverse rock-shaft 8 of the beam is furnished with a rearwardly-projecting arm 80, to which is pivoted the link 81, the latter being likewise connected with the crank-arm 82, that extends from the hub 83 of the valve V', pivoted, as at 84, to the reservoir or hopper O, said reservoir being suitably secured to the cross-plate 85, which is located between the frame members 3 and 4. The hub 83 is furnished with a crank-arm 86, to which is jointed the link 87, said link having at its opposite end the loop 88, embracing a projection 89 on the crank-arm 90, which extends from the valve-shaft 75.

When the parts are in their primary positions, (indicated in Fig. 3,) the two valves V and V' are open, whereby the material may be delivered into the bag R', thereby causing said bag to descend with the poising mechanism, and at a certain stage in this operation the arm 80 of the beam will be elevated, thereby through intermediate connections drawing the link 87 to the right to the position shown in Fig. 4, so that the inner end of the loop 87 is carried away from the projection or pin 89, whereby the weight 77 can drop to close the valve, as shown in Fig. 4, it being understood that the bag R' at this time has received the requisite quantity of material.

It will be understood that the bag R' receives the greater portion of the overcharge, the remainder of such overcharge being delivered to the auxiliary receiver R and to the conveyer C' therein. When the two receivers are overloaded, the surplus will be withdrawn from the receiver R by the conveyer C' as it is driven rearward, and when the surplus is removed the material in the receiver R, which forms a part of the true load, will be discharged into the bag, which latter can then be removed.

The drivers for operating the conveyer C' may be of any suitable construction, they being represented as a series of fixed pulleys $t$ and $t'$, respectively, suitably secured to the shaft 95, said shaft alternating with the loose or idle pulleys $i$ and $i'$, mounted on said shaft, a series of belts, as $b$, $b'$, and $b''$ being shiftable or slidable along the series of fast and loose pulleys, said belts being passed around the power transmitter or drum 96, secured to the shaft 53.

The shaft 95 is connected by the universal coupling device 97 with the rear shaft 69 of the conveyer C', (see Fig. 1,) and the shippers for the belts are designated, respectively, by 99 and 100, each of said shippers being in the form of a reciprocatory bar mounted to move transversely in apertured lugs or guides, as 101 and 102, on the transverse plate 85, the belt-shipper 99 being spring-operated in one direction and oppositely operated by the weighing mechanism or the scale-beam B thereof.

The belt-shipping bar 99 near one end thereof is encircled by the coiled retracting-spring 103, which acts, respectively, against the stop or collar 104 on the inner end of said bar and the lug 101, said bar being furnished at its opposite end with the usual belt-engaging fingers 105, between which the belt $b$ is adapted to travel.

An oscillatory arm is represented at 106, connected with the pivot 107 on the bracket 108, projecting from the framework, said pivot being furnished with a protuberance 109, disposed in the path of movement of the belt-shipper actuator 110, consisting of a pivoted dog on the link 112, said link being pivoted to the arm 113, that extends rearward from the beam-shaft 8, and the arm 106 being pivoted to the sleeve 106' on the belt-shipping bar 99.

The belt-shipper 100 is also connected with the scale-beam for operation. The lower end of the connecting-link 112 is pivoted to the universal coupling device 114, which is connected to the arm 115 of the angle-lever A, suitably pivoted to the transverse plate 85, the arm 116 of the angle-lever being bifurcated, the respective branches of the bifurcation having longitudinal slots, as 117, embracing pins, as 118, on the opposite sides of the belt-shipping bar 100. The belt-shipper 100 has the belt-engaging fingers 119 and 120 projecting radially therefrom in different planes, and between which the belts $b'$ and $b''$ are adapted to run, the belt $b''$ being crossed, whereby the conveyer C can be reversely driven when said belt is on the fixed or tight pulley $t'$.

At the commencement of operation (see Fig. 1) the belt $b$ will be on the loose pulley $i$, the belt $b'$ being on the fixed pulley $t$ and the belt $b''$ being on the loose pulley $i'$, so that the continuously-operative power-transmitter 96, through the belt $b'$ and pulley $t$, is adapted to drive the conveyer C forward in the direction of the arrow in Fig. 6 for conducting the supply delivered by the moving conveyer C into the empty bag R'. At the initial stage of operation the pivoted actuator 110 will be against the protuberance 109, as indicated in Fig. 9.

When the two receivers have been overloaded, they will descend to the positions indicated in Fig. 7, the pivoted belt-shipper actuator 110 being at a point considerably above the protuberance 109 and the belt $b$ still running in contact with the loose pulley $i$. As the poising sides or arms 9 and 9' of the beam B descend the oppositely-disposed arm 10, and consequently the arm 113, will be elevated to raise the link 112, and hence the actuator 110, to its highest position, and as the link is thus elevated the belt-shipping bar 100 will be slid to ship the belts $b'$ and $b''$ to the loose pulley $i$ and the tight pulley $t$, respectively, as represented in Fig. 7, whereby the conveyer C' can be reversely driven to convey the surplus from the load-carrying means into the reservoir or hopper O, the valve V' of which is shut, as illustrated in Fig. 4. As the material is removed from the load-receiver R on the movement of the conveyer C' the poising side of the beam will ascend, the link 112 being thereby thrust downward, whereby the bar 100 will be slid inward to ship the crossed belt $b''$ from the tight pulley $t'$ to the loose pulley $i'$, whereby the reverse movement of the conveyer C' will cease, it being understood that when the belts are thus shipped the load has reached completion. About this time the valve V will be swung open to the position indicated in Fig. 5, and simultaneously therewith the actuator 110 will be forced against the protuberance 109 to slide the belt $b$ from the loose pulley $i$ to the tight pulley $t$, as represented in Fig. 8, whereby the material on the conveyer C' can be discharged into the bag R' as it forms a part of the load.

When the bag is filled, it can be removed, at which time the counterweight W will return the parts to their normal positions, the actuator 110 during this operation slipping off the protuberance 109, so that the belt $b$ can be shipped from the tight pulley $t$ to the loose pulley $i$, where it is shown in Fig. 1, and simultaneously therewith the belt $b'$ will be shipped farther along the loose pulley $i$ and the belt $b'$ will be shifted from said pulley $i$ to the tight pulley $t'$, the parts at this time having reached their primary positions. (Shown in Fig. 1.)

When the surplus is removed from the receiver R', the material remaining in said receiver constitutes a part of the predetermined load, the major part of such load being in the bag R', and for the purpose of causing the smaller part of the load to enter the bag the conveyer C' will be driven forward, as hereinbefore stated, and simultaneously therewith the valve V will be opened, whereby the mass can freely descend into the bag.

The valve-shaft 75 has a crank-arm 115, provided near its free end with a projection 116, disposed in a longitudinal loop 117 on the upper end of the link 118, said link being pivoted to the rock-arm 119, that extends from the hub 120 on the projecting pivot 121 on the end of the receiver or hopper R, the arm 119 being counterweighted, as at 122. The hub 121 forms a part of the segment 123, which is preferably engaged by a suitable detent, as 124, pivoted to the receiver, the arm 125 of said detent being adapted to engage a shoulder on one end of the segment 123, thereby to hold the weight 122 out of action.

The latch or detent 124 is coöperative with a by-pass tripper 125' of ordinary construction, counterweighted and pivoted near the outer end of the cam-bracket 126 on the framework.

At the commencement of operation, as shown in Fig. 3, the projection 116 will be against the lower end of the loop 117, and when the valve V is shut, as represented in Fig. 4, the projection 116 will be forced upward until it nearly reaches the upper end of the loop 117, and during this period of the operation of the latch or detent 124 will have passed to a point below the coöperating by-pass tripper 125'. As the material is removed from the receiver R it will of course rise, the belt $b''$ being slowly shipped from the pulley $t'$, while the belt $b'$ is being shipped to the pulley $t$, this operation being completed when the true load is in the two receivers, the arm 130 of the latch then abutting against the by-pass tripper 125', (see Fig. 8,) whereby the segment 123, and consequently the weight 122, will be released, and the weight by dropping will rapidly draw the link 118 downward to swing the valve V open, so that the conveyer C' which is being driven forward can force the material from the receiver R into the bag R'.

On the final action of the parts locking means are brought into operation for preventing the poising side of the weighing mechanism from ascending when the filled bag is removed.

The hub 120 is furnished with the locking-arm 131, which on the release of the segment 123 and the weight 122 is caused to impinge against the working face 132 of the cam-bracket 126, as shown in Fig. 5.

When the latch 125 is tripped, as shown in Fig. 5, its arm 125 will swing around and ride in contact with the curved face of the segmental plate 123, so as to hold said latch in proper position to engage the notch of the segmental plate when the latter is returned to its primary position, the release of the parts being effected, preferably, by hand. The segment has suitably secured thereto the lever 136, which is furnished at its upper end with the handle 137 to manipulate the same.

In Fig. 5 the locking-arm 131 is shown coöperating with the cam-face 132 to lock the receiver R against ascending movement. To unlock said receiver when an empty bag is placed in position under the same, an attendant will grasp the handle 137 and disengage the arm 131 from the cam-face 132.

For the purpose of receiving the surplus removed from the receiver R during the weighing of a load the auxiliary receiver or hopper O is provided, the valve V' of which is closed by reason of its connection with the scale-beam, as will readily be obvious, said receiver being located under the rear end of the conveyer C', whereby when the valve is closed said reservoir or hopper will receive the material withdrawn from the receiver R. On the return of the weighing mechanism to its initial position the valve V' will be swung open, whereby the material within the reservoir can enter the spout 140 on the rear side of the receiver and from thence pass into the empty bag.

For the purpose of preventing undue oscillation of the hangers 22 and 23 as they reciprocate said hangers will preferably run between guides on the framework. Said guides are represented consisting of the segments 150, 151, 152, and 153, pivotally mounted and connected with the bag-support 25. The segments 150 and 152 are pivoted to the side frames 3 and 4, respectively, while the segments 151 and 153 are pivoted to posts 154, and 155 properly secured to the base 2. The hanger 23 reciprocates between the segments 150 and 151 on one side of the machine, while the hanger 22 reciprocates between the other segments on the opposite side of the machine, the several segments being connected with the bag-support by the links 150', 151', 152', and 153', the connections being pivotal ones. As the bag rest or support 25 rises and falls during the operation of the machine the several segments will be maintained substantially in contact with the two hangers 22 and 23.

The operation of the hereinbefore-described machine, briefly stated, is as follows: Figs. 2 and 3 represent the positions occupied by the various parts at the commencement of operation, an empty bag R' being on the support 25 and hooked over the spur 7 on the receiver R, and the conveyer C being in motion a stream of large volume will be conducted by said conveyer into the receiver R, from whence it is fed to the bag R' by the conveyer C', which is being driven in the direction indicated by the arrow in Fig. 6 by the means hereinbefore described, and this operation will continue until the two receivers are overloaded, prior to which the valve V will be swung under the delivery end of the conveyer, as shown by the dotted lines in Fig. 4. When the load-receivers are overcharged, the members of the clutch C will be uncoupled, as hereinbefore set forth, to throw the supply-conveyer C out of action. When the two receivers have reached the limit of their descending stroke, (represented in Fig. 7,) the belts $b$ and $b'$ will have been shifted to the two loose pulleys $i$ and $i'$, respectively, while the crossed belt will be on the tight or fixed pulley $t$ to drive the conveyer C' reversely, whereby said conveyer will conduct the surplus from the receiver R and deliver it to the stationary reservoir O, the valve V' of which is closed, as shown in Fig. 4. As the material is removed from the receiver R the latter will rise, so that the belt-shipping mechanism is rendered effective, in the manner hereinbefore set forth, for shifting the belt $b''$ from the pulley $t'$ to the loose pulley $i'$ and the belt $b'$ to the pulley $t$ to again drive the belt or conveyer C' forward. During the descent of the weighing mechanism the latch 124 will pass to a point below the by-pass tripper 125', as shown in Fig. 4, whereby on the ascent of the receiver R the latch-arm 130, by impinging against said tripper, will disengage said latch from the segmental plate 123 to release said plate, and consequently the weight 122, whereby said weight can drop to draw the link 118 downward for swinging the valve V open, whereby the material within the receiver R can enter the bag R'. When the weight drops, the locking-arm 131 will swing therewith, and its free end will ride in contact with the cam-face 132 to block the ascent of the weighing mechanism to permit the removal of the filled bag.

To start the machine in operation, the handle 137 will be grasped by the attendant and the locking-arm 131 disengaged from the cam-face 132, thereby unlocking the receiver, whereby it can be instantly returned to its primary position, when the operation will be repeated.

Having described my invention, I claim—

1. The combination, with a scale-beam, of a receiver suspended from the scale-beam; means for supplying an overload part of which is delivered to said receiver and the remainder to a bag also suspended from the scale-beam; a conveyer mounted on the receiver; and means controlled by the weighing mechanism for operating said conveyer at different times during the weighing of a load.

2. The combination, with weighing mechanism comprehending a receiver, of a feed-case; a supply-conveyer situated in the feed-case and adapted to furnish an overload part of which is delivered to a receptacle supported by the weighing mechanism and the remainder to said receiver; driving means for operating the conveyer; means controlled by the weighing mechanism for throwing the supply-conveyer out of action when an overload has been supplied; a second conveyer mounted for movement with said receiver; and means controlled by the weighing mechanism for operating said second conveyer at different times during the weighing of a load, whereby it is adapted to remove the surplus from the weighing mechanism at one time and also to supply the receptacle at another time.

3. The combination, with weighing mechanism comprehending a load-receiver and a receptacle suspended therefrom, of means for supplying an overload, part of which is delivered to said receptacle and the remainder to said load-receiver; a conveyer mounted upon the load-receiver; and means controlled by the weighing mechanism for operating the conveyer in opposite directions and at different times during the weighing of a load.

4. The combination, with a scale-beam, of a support for a bag suspended therefrom; a hopper also suspended from the scale-beam; a feed-case; a supply-hopper situated in the feed-case and adapted to supply an overload, part of which is delivered to the bag and the remainder to the hopper; means for operating the conveyer, said means including a clutch, one of the clutch members being connected with the scale-beam, whereby said clutch members will be uncoupled when the receivers are overloaded; a second conveyer supported in said hopper; and means controlled by the scale-beam, for operating said second conveyer during the weighing of a load, whereby it is adapted to remove the surplus from the weighing mechanism.

5. The combination, with weighing mechanism embodying a receiver, of means for supplying an overload part of which is delivered to a receptacle supported by the weighing mechanism and the remainder to said receiver; a valve carried by said receiver; means for actuating the valve; a conveyer mounted on the receiver; and means for operating said conveyer at different times during the weighing of a load.

6. The combination, with weighing mechanism comprehending a receiver, of a valve situated in said receiver; means for closing said valve at a predetermined stage in the descent of said receiver; means for supplying an overload part of which is delivered to a receptacle supported by the weighing mechanism and the remainder to said receiver when the valve is closed; a conveyer carried by the receiver; and means for operating said conveyer at different times during the weighing of a load.

7. The combination, with weighing mechanism comprehending a receiver, of an oscillatory valve situated in said receiver; means for supplying an overload part of which is delivered to a receptacle supported by the weighing mechanism and the remainder to said receiver; a conveyer mounted upon said receiver; means for swinging the valve under one end of the conveyer; and mechanism for operating said conveyer at different times during the weighing of a load.

8. The combination, with weighing mechanism comprehending a receiver, of an endless belt carried by the receiver; means for driving the belt at different times and directions during the weighing of a load; a valve; means for swinging the valve under one end of the belt at a predetermined stage; and means for supplying an overload part of which is delivered to a receptacle supported by the weighing mechanism and the remainder to said receiver.

9. The combination, with weighing mechanism comprehending a receiver, of a conveyer mounted for movement with said receiver; means for supplying an overload part of which is delivered to a receptacle supported by the weighing mechanism and the remainder to said receiver; and means operative during the weighing of a load for successively driving the conveyer in forward and backward directions.

10. The combination, with weighing mechanism comprehending load-carrying means, of a conveyer carried by the load-carrying means; and mechanism operative for first driving the conveyer forward, then backward, and then forward, said mechanism being controlled by the weighing mechanism.

11. The combination, with weighing mechanism comprehending a receiver, of means for supplying an overload part of which is delivered to a receptacle supported by the weighing mechanism and the remainder to said receiver; a conveyer mounted on the receiver; means for driving the conveyer successively in forward and backward directions during the weighing of a load; a valve; and means for swinging the valve under one end of the conveyer when the latter is driven forward.

12. The combination, with weighing mechanism comprehending a receiver, of means for supplying an overload part of which is delivered to a receptacle supported by the weighing mechanism and the remainder to said receiver; a conveyer mounted on said receiver; driving mechanism for the conveyer, embodying a series of pulleys and belts shiftable along the pulleys, one of the belts being crossed; and means controlled by the weighing mechanism for shifting said belts along the pulleys at different times in the operation.

13. The combination, with weighing mechanism comprehending a receiver, of means for supplying an overload part of which is delivered to a receptacle supported by the weighing mechanism and the remainder to said receiver; a conveyer mounted on said receiver; driving mechanism for said conveyer, including a series of fast and loose pulleys disposed in alternate relation; a series of belts shiftable along said pulleys; and independently-operable means controlled by the weighing mechanism for shifting said belts at different times during the weighing of a load.

14. The combination, with a scale-beam, of a receiver suspended therefrom; a conveyer mounted on the receiver; driving mechanism for said conveyer, including fixed and loose pulleys and a belt; a belt-shipper; a spring adapted to act against the belt-shipper; an arm connected to the belt-shipper and having a protuberance; and a link secured to the scale-beam and provided with a device for engaging said protuberance.

15. The combination, with a scale-beam, of a receiver suspended therefrom; a conveyer carried by said receiver; driving mechanism for said conveyer, including a series of tight and loose pulleys and a belt; a belt-shipper; an arm mounted on the framework and connected with the belt-shipper, said arm having a protuberance; and a link secured to the scale-beam and provided with a projection adapted to engage said protuberance.

16. The combination, with weighing mechanism involving load-carrying means, of a conveyer mounted for movement with the load-carrying means; a series of tight and loose pulleys connected with the conveyer; belts shiftable along said pulleys; a shipper for one of the belts; a second shipper for another belt; and a link connected with the weighing mechanism and with one of the belt-shippers, said links being provided with a device for effecting the operation of the other belt-shipper.

17. The combination, with weighing mechanism involving load-carrying means, of a conveyer mounted for movement with the load-carrying means; driving mechanism for said conveyer, embodying a series of tight and loose pulleys connected with the conveyer; belts shiftable along said pulleys, one of said belts being crossed; a shipper for the crossed belt; a second shipper for the other belt, encircled by a spring which acts against a stop thereon; an arm connected to said second shipper and provided with a protuberance; and a link connected with the first-mentioned belt-shipper and having a by-pass actuator for engaging said protuberance.

18. The combination, with weighing mechanism involving load-carrying means, of a conveyer supported by the load-carrying means; driving mechanism for said conveyer, including a series of pulleys and belts shiftable along said pulleys, one of said belts being crossed; a shipper for said crossed belt; a second shipper for the other belt; a lever connected to the first-mentioned shipper; a spring encircling the other shipper and acting against a stop thereon; an arm pivoted to the framework and connected to said second shipper, said arm having a protuberance; and a link connected, respectively, to the weighing mechanism and to said lever, said link being furnished with an actuator for engaging said protuberance.

19. The combination, with weighing mechanism comprehending a load-receiver and a receptacle supported thereby, of means for supplying an overload, part of which is delivered to said receptacle and the remainder to said load-receiver; a conveyer carried by the load-receiver; means for driving said conveyer in opposite directions during the weighing of a load; and a reservoir situated in proximity to the conveyer to receive the material conducted by the conveyer from the load-receiver.

20. The combination, with a scale-beam, of a hopper suspended therefrom; a support for a bag, also suspended from the scale-beam; a conveyer situated in the hopper; means for supplying an overload, part of which is delivered to the hopper and the remainder to the bag on said support; instrumentalities for driving the conveyer during the weighing of a load, thereby to remove material from the hopper; and a valved reservoir located in proximity to the conveyer, to receive material therefrom, the valve of said receiver being connected with the scale-beam for operation.

21. The combination, with a scale-beam, of a plurality of receivers suspended therefrom; a valve mounted on one of the receivers; a shaft supporting the valve, said shaft having a crank-arm provided with a projection; connections with the valve and the scale-beam, embodying a link having a loop at one end embracing said projection; and means for supplying an overload part of which is delivered to one receiver and the remainder to the other receiver.

22. The combination, with a scale-beam, of a receiver suspended therefrom; a valve carried by the receiver; a shaft for supporting the valve, said shaft having a crank-arm provided with a projection and also having an actuator; connections between the valve and scale-beam, embodying a link provided with a loop at one end embracing said projection; and means for supplying an overload part of which is delivered to a receptacle supported by the weighing mechanism and the remainder to said receiver.

23. The combination, with a scale-beam, of a receiver suspended therefrom; a valve mounted on the receiver; a shaft supporting the valve, said shaft having a crank-arm provided with a projection and also having an actuator for the valve; a conveyer situated in said receiver; driving means for the conveyer; and connections between the valve and the scale-beam, involving a link furnished with a loop at one end which embraces said projection.

24. The combination, with weighing mechanism comprehending a receiver, of a valve mounted on the receiver; a shaft for supporting the valve and having two crank-arms furnished with projections; an actuator having a link connected therewith provided with a loop embracing one of said projections; and a second link also having a loop embracing the other projection, said second link being connected with the weighing mechanism.

25. The combination, with weighing mechanism comprehending a receiver, of a valve; a shaft supported by the receiver and furnished with two crank-arms each having a projection; an actuator having a link connected therewith and provided with a loop which embraces one of the projections; a second link also having a loop embracing the other projection; a conveyer mounted on the receiver; a valved reservoir situated in proximity to the receiver, and connections between said valve and second link and weighing mechanism, respectively.

26. The combination, with weighing mechanism comprehending a receiver, of a cam; a locking-arm mounted on the receiver and cooperative with the cam; a counterweight connected with said locking-arm; a valve; a shaft for supporting the valve supported by the load-receiver and furnished with crank-arms each having a projection, said shaft being also equipped with a counterweighted arm; connections between the weighing mechanism and the valve, involving a link furnished with a slot at one end embracing one of said projections; and a second link having a loop embracing the other projection, said loop being connected with the first-mentioned counterweighted arm.

27. The combination, with a scale-beam, of hangers depending therefrom; load-carrying means supported by the hangers; and a series of segments pivoted to the framework and disposed in pairs, each hanger being adapted to reciprocate between a pair of said segments.

28. The combination, with a scale-beam, of a support for a bag and a receiver; hangers depending from the scale-beam, to which the receiver and bag-support are secured; and a series of segments arranged in pairs, each of the segments being connected with the bag-support, and each hanger being disposed between a pair of the segments.

FRANCIS H. RICHARDS.

Witnesses:
F. N. CHASE,
ANDREW FERGUSON.